United States Patent

[11] 3,612,660

[72] Inventor Wendell S. Miller
1341 Comstock Ave., Los Angeles, Calif. 90024

[21] Appl. No. 855,973
[22] Filed Sept. 8, 1969
[45] Patented Oct. 12, 1971

[54] DIGITAL DATA COMPACTION
30 Claims, 9 Drawing Figs.

[52] U.S. Cl. .......... 340/172.5
[51] Int. Cl. .......... G06f 1/00
[50] Field of Search .......... 340/146.2, 172.5; 235/157, 177

[56] References Cited

UNITED STATES PATENTS

| | | | |
|---|---|---|---|
| 3,214,736 | 10/1965 | Glaser .......... | 340/172.5 |
| 3,275,989 | 9/1966 | Glaser et al. .......... | 340/172.5 |
| 3,289,169 | 11/1966 | Mariosz .......... | 340/172.5 |
| 3,413,611 | 11/1968 | Pfuetze .......... | 340/172.5 |
| 3,434,109 | 3/1969 | Coote .......... | 340/146.2 |
| 3,490,690 | 1/1970 | Apple .......... | 340/172.5 X |

*Primary Examiner*—Gareth D. Shaw
*Assistant Examiner*—Sydney R. Chirlin
*Attorney*—William P. Green

ABSTRACT: Data-processing equipment for writing a list of digital words, and then scanning the list to determine whether it includes a predetermined particular digital word, with the list being compacted to occupy a reduced space or time by omitting some of the digits of some of the words in the list when those digits are identical with corresponding digits of other words in the list, or can be derived therefrom.

INVENTOR.
WENDELL S. MILLER
BY William P. Green
ATTORNEY

WENDELL S. MILLER
INVENTOR.

BY William P. Green
ATTORNEY

INVENTOR.
WENDELL S. MILLER

BY William P. Green
ATTORNEY

INVENTOR.
WENDELL S. MILLER
BY William P. Green
ATTORNEY

INVENTOR.
WENDELL S. MILLER
BY William P. Green
ATTORNEY

DIGITAL DATA COMPACTION

BACKGROUND OF THE INVENTION

This invention relates to improved data-processing apparatus for handling lists of digital words in compacted form.

In many types of data-handling equipment, it is desirable for apparatus to produce and respond to a long list of digital words, each including a series of digits which are usually binary in form. For example, the various words may represent a series of binary numbers designating certain customers of a business, or patrons of a library or the like, with the persons on the list typically being those who for some reason are not entitled to a particular privilege such as the right to purchase on credit, the right to withdraw a book from the library, etc.

In writing and utilizing lists of the above discussed type, the practical circumstances surrounding use of the list frequently require scanning of the list in an absolute minimum of time. To minimize the time required for this purpose, various types of information-coding techniques can be utilized for increasing the number of data bits which may be recorded on a record track, or transmitted between different locations in a given interval. However, there is of course a limit to the number of data bits which may be produced in a certain interval, and if enough digital words are included in the list an excessive overall scanning period may be very difficult to avoid no matter how closely packed the data bits may be.

SUMMARY OF THE INVENTION

The present invention provides an arrangement in which, in order to increase the number of digital words which may be compacted into a particular space or time, some of the words in a list are written only partially in a manner omitting certain portions of individual words which are determined to be identical with corresponding portions of other words. In certain forms of the invention, special key signals are included in the list, in conjunction with the series of digital words, to indicate by the presence or absence of a key signal at a particular location whether or not a certain word is included in its entirety or only partially. Preferably, the words are written into the list as a series of families of words, with the words in each family having a particular portion in common, and with that portion being written into only the first word of the family, or only at a predetermined location in the list, and being assumed in the rest of the words thereof. When the mentioned key signals are utilized, they may be provided just prior to the commencement of a new family of words on the record or transmission track, so that each key signal indicates that the scanning equipment will receive all of the digits of the first word following the key signal, and will receive only certain predetermined portions of the next series of words until the next successive key signal is received.

In writing a list having such key signals, the apparatus may compare two words to determine whether certain digits of the words are identical, and may respond to the result of this comparison to write either the entire word or only an unrepeated portion of the word, together with the appropriate key signals. The apparatus for scanning or responding to the list may then be capable of comparing the digits of each word in the list with digits of a predetermined particular word being analyzed, and may function in one condition to compare all of the digits of that particular word with a series of digits in the list, and in another condition to compare only a portion of the digits of the particular word with a series of digits in the list. Conversion between these two conditions is effected by the discussed key signals which accompany the list and indicate its significance.

In another form of the invention, a series of families of digital words are written as successive lines on a record medium, and a key or control signal associated with the particular word being searched for is utilized to select for scanning only a certain predetermined one of several columns of words on the record medium. The control signal in this instance indicates which column would contain the word being searched for if it is present at all.

BRIEF DESCRIPTION OF THE DRAWINGS

The above and other features and objects of the invention will be better understood from the following detailed description of the typical embodiments illustrated in the accompanying drawings, in which.

DESCRIPTION OF THE PREFERRED EMBODIMENTS

Figure 1:
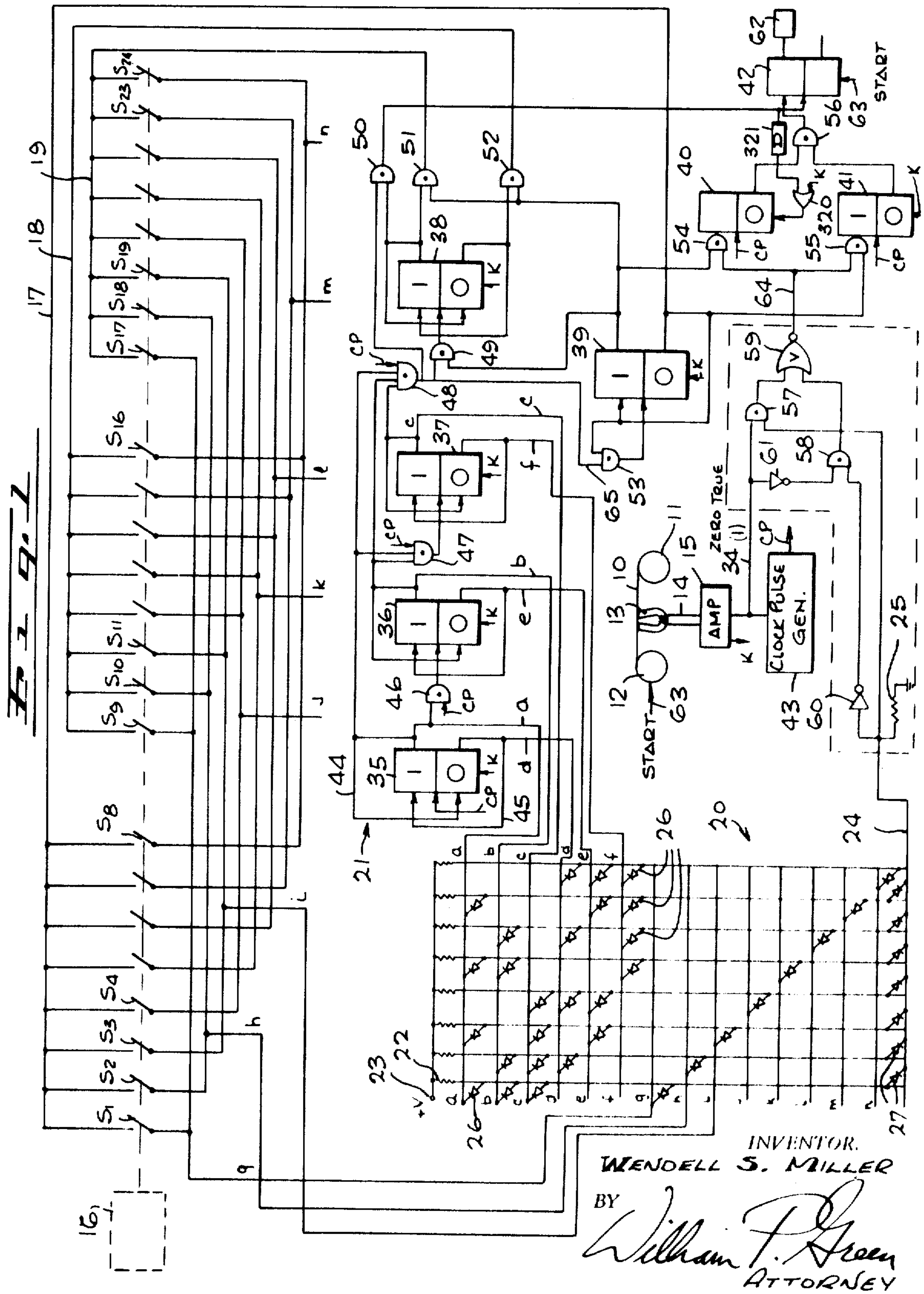
FIG. 1 is a diagrammatic representation of the circuit of a list-scanning unit constructed in accordance with the invention.

The apparatus of FIG. 1 is adapted to scan sequentially through a list of digital words which are preferably recorded on a suitable record track, such as a magnetic recording tape 10 which is advanced at uniform rate between two reels 11 and 12 and past a playback head 13 having a pickup coil 14 delivering an electrical signal to amplifier 15. The digital words carried on the tape 10 are compared sequentially with a particular individual digital word supplied to the equipment from a source typically represented at 16 in FIG. 1. Source 16 actuates a number of switches $s_1$, $S_2$, $s_3$, $s_4$, etc. to different settings representing in binary form the different digits respectively of the particular number supplied by source 16. For example, $s_1$ may represent the first digit, which will be considered to be a binary one if $s_1$ is open, and a binary zero if $s_1$ is closed. Similarly, $s_2$ represents the second digit of the number, as a one or zero, in the same manner, and the other switches $s_3$, $s_4$, $s_5$, etc. represent the remaining digits in binary form. In the particular arrangement illustrated in FIG. 1, it is typically assumed that there are 24 of the switches $s_1$, $s_2$, etc., divided into three groups of eight each, and with the first group of switches being connected at one side to a common line 17, the second group of eight switches being connected to a line 18, and the third group of switches being connected to a line 19.

The lower sides of the switches are connected to a number of lines *g*, *h*, *i*, *j*, *k*, *l*, *m*, and *n*, which are in turn connected to the correspondingly designated lines *g*, *h*, *i*, *j*, *k*, *l*, *m*, and *n* of a diode matrix 20. As will be apparent from FIG. 1, line *g* connects to the lower sides of the first switches of each of the three groups of switches, that is, line *g* connects to switch $s_1$, switch $s_9$ and switch $s_{17}$. Similarly, line *h* connects to the second switch of each group, that is, switches $s_2$, $s_{10}$, and $s_{18}$, which line *i* connects to switches $s_3$, $s_{11}$, and $s_{19}$; etc.

The additional horizontal lines *a*, *b*, *c*, *d*, *e*, and *f* of diode matrix 20 are connected to a multivibrator-type sequencing circuit 21 which will be discussed in greater detail at a later point. The vertical lines of matrix 20 are connected through individual load resistors 22 to the positive terminal 23 of a direct current power source, whose negative terminal is connected to ground. The bottom horizontal line 24 of the matrix connects to ground through a resistor 25. The various horizontal lines *a* through *n* of the matrix are connected to the vertical lines through a number of diodes 26 which in effect form in association with each of the vertical lines a logical AND circuit. A horizontal row of reverse diodes 27 connecting bottom horizontal line 24 of the matrix to each of the vertical lines form together an OR circuit by which the output of the matrix is delivered to line 24.

Figures 2, 3:
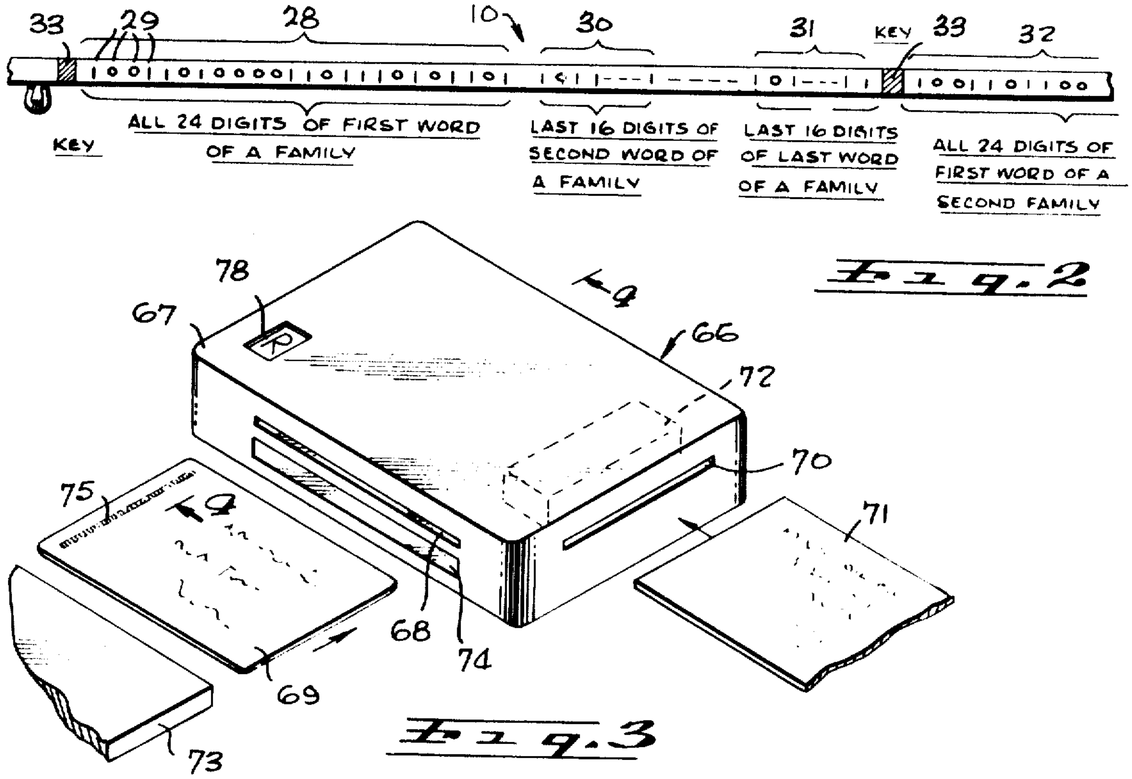
FIG. 2 illustrates the manner in which a list and associated key signals are recorded on the magnetic tape or other record track of FIG. 1.
FIG. 3 shows in perspective a credit card checking device which may contain the circuitry of FIG. 1.

Referring now to FIG. 2, the magnetic tape 10 or other record track of FIG. 1, which carries the list to be scanned, is illustrated diagrammatically at 10 in FIG. 2, along with diagrammatic representations of the data recorded on the tape. Assuming that the tape moves from right to left in FIG. 2, the first recorded digital word to pass playback head 13 is designated 28, and is complete, that is, it includes magnetic data bits recorded on the tape and representing sequentially all 24 of the individual binary digits 29 of the words. The next word on the list, represented at 30 in FIG. 2, is assumed to have a first group of digits which are identical with the corresponding first group of digits of word 28, and which therefore are not repeated on the tape. In the particular form of the invention being discussed, word 30 is assumed to have its first eight digits identical with word 28, and therefore not repeated, and as a result only the last 16 digits of word 30 are recorded on the tape. This word may then be considered as the second word of a family having the first eight digits identical. After the word 30, a series of additional words in the family are recorded on the tape, with only the last 16 digits of each of those words being recorded, and with the first eight digits being assumed to be identical with the first eight digits of the first word of the family, that is, word 28. The last word of this family is illustrated diagrammatically at 31 in FIG. 2. The first word of the next family, number 32, is written completely on the tape, with each of its 24 binary digits being recorded sequentially as in the case of initial word 28, because the first eight digits of word 32 are changed, and are not the same as the words of the preceding family. After word 32, other words in this second family, having an initial eight digits identical with those of word 32, are recorded on the tape incompletely, with only their last 16 digits being written onto the tape. Thus, a large number of the digits which would otherwise be required to write the words or numbers completely are omitted, and the list is therefore greatly compacted for recording on a relatively short length of tape or other record track.

Preceding each of the initial or completely written words 28, 32, etc. of a family, there is recorded on the tape 10 a special key signal 33, which indicates the commencement of a new family of words, and indicates that the next successive word is completely written on the tape. This signal may be of any convenient type distinguishable from the signals representing the binary digits, and for example may be a relatively extended alternating current signal of a predetermined distinguishable frequency, or may be indicated simply by application of a preferably somewhat extended direct current pulse to the tape to which head 13 and amplifier 15 may respond.

The amplifier 15 delivers to an output line 34 signals representing sequentially all of the binary digits recorded on tape 10, as represented in FIG. 2. The key signals 33 are not delivered to line 34, but rather are delivered to an additional output line K, which delivers an overriding input at K into each of a number of clocked master slave flip-flops 35, 36, 37, 38, 39, 40, and 41. These signals act upon response of pickup head 13 to each of the recorded key signals 33 on tape 10 of FIG. 2 to actuate each of the flip-flops 35, 36, 37, etc. to its lower or zero state, to commence a sequencing operation adapted to scan through a full 24 digit word on the tape. The amplifier 15 also energizes a clock pulse generator 43, which produces a clock pulse associated with each of the digit representing signals in line 34, and following that associated signal by a slight delay interval of a duration which is small as compared with the length of an individual bit cell. These clock pulses are delivered from generator 43 through line CP to the various clocking and control lines also designated CP at other points on FIG. 1.

The outputs from flip-flops 35, 36, and 37 are connected to the previously mentioned horizontal lines *a*, *b*, *c*, *d*, *e*, and *f* of diode matrix 20, with the flip-flops being of a character acting to ground a normally open circuit to the associated line *a*, *b*, *c*, etc. when the flip-flop is in the particular state associated with that line (i.e. when the assertion of the digit indicated is true). It is noted that flip-flops 35, 36, 37 and 38 also have feedback lines, such as lines 44 and 45 associated with flip-flop 35, adapting these flip-flops to function as J-K flip-flops, which change their setting upon each clocked actuation thereof. In conjunction with the flip-flops and other circuitry, there are provided a number of logical AND circuits 46 through 58, a NOR circuit 59, and two inverting circuits 60 and 61, all interconnected in the manner illustrated clearly in FIG. 1. The result of a particular scanning operation is indicated by a light or other indicator element represented at 62, which is controlled by output flip-flop 42.

To discuss now a cycle of operation of the apparatus shown in FIG. 1, assume that source 16 has been supplied with information corresponding to a particular binary number having 24 binary digits, and has actuated switches $s_1$, $s_2$, $s_3$, etc. to positions representing those digits respectively, and particularly with each switch being open if the corresponding digit is a one, and closed if the corresponding digit is a zero. Also, assume that tape 10 carries information of the type represented in FIG. 2, and is advanced at a uniform rate past head 13. Actuation of an appropriate start switch energizes the equipment to commence advancement of the tape, and also acts through overriding input line 63 of flip-flop 42 to actuate that flip-flop to its lower state just prior to commencement of the tape movement. The first signal on the tape which passes pickup head 13 is one of the key signals 33 of FIG. 2, which signal after amplification acts through lines K of FIG. 1 to actuate the flip-flops 35, 36, 37, 38, 39, 40 and 41 all to their lower states. When the flip-flops are in these lower states, line 17 is connected to ground through flip-flop 39, while the two lines 18 and 19 are both disconnected from ground. Thus, lines *g*, *h*, *i*, etc. are connectable respectively to ground through their related switches $s_1$, $s_2$, $s_3$, $s_4$, through $s_8$, but are not groundable through the remaining switches $s_9$ through $s_{24}$. The flip-flop sequencing arrangement acts to sequentially compare the settings of the first eight switches with the first eight data bits read off of a tape after the key signal 33.

In comparing the first digit from tape 10 with the setting of switch $s_1$, the flip-flops 35, 36 and 37 initially render active the AND circuit associated with the first or left-hand vertical line 22 of diode matrix 20. This result occurs because all of the three flip-flops 35, 36 and 37 are in their lower states, in which their three lower output lines *d*, *e*, and *f* are grounded through the flip-flops, but their upper output lines *a*, *b*, and *c* are ungrounded. Thus, the only way to ground their first vertical line is through horizontal line *g* and the associated one of the diodes 26, so that if switch $s_1$ is closed, representing a zero, line 22 is at ground potential and therefore negative, while if switch $s_1$ is open, representing a one, line 22 is ungrounded and its lower portion is at a higher or positive potential with respect to ground. This higher potential passes through the left-hand one of the bottom diodes 27 into line 24, to produce a positive signal in that line representing a one at switch $s_1$. In this condition in which the first vertical line 22 is active, it will be noted that all of the other vertical lines are grounded through one or more of the diodes 26 to one or more of the grounded horizontal lines *d*, *e*, or *f*.

The system enclosed within dotted lines in the lower portion of FIG. 1 is an EXCLUSIVE OR logical array resulting in a logically true (grounded) output on line 64 when the signals on lines 24 and 34 are of different logical value (polarity) and not otherwise. Thus true signals on lines 24 and 34 (ground potential) will pass through AND-gate 57 and inhibit a true output from NOR gate 59 onto line 64. Similarly false (positive) signals on lines 24 and 34 will be inverted by elements 60 and 61 and will pass through AND-gate 58 as a true signal and similarly inhibit a TRUE output from NOR-gate 59. If the inputs on lines 24 and 34 are logically different, false outputs will appear on both inputs to NOR gate 59 and a true output will result on line 64. This output signal on line 64 combines with the output from the lower state of flip-flop 39, through AND circuit 55, to actuate flip-flop 41 to its upper state in response to the clock pulse delivered from generator 43 immediately following receipt of the first digit from tape 10. If the two digits being compared are identical, flip-flop 41 of course remains in its lower state.

The clock pulse produced by the first digit on tape 10 also is applied to flip-flop 35, and actuates that flip-flop to its upper state, to thus ground line $a$ instead of line $d$ from that flip-flop, and because of the pattern of the diodes 26 in matrix 20 select the next successive vertical line 22, associated with horizontal line $h$ and switch $s_2$, for use in reading the next digit from the tape. In this condition, all of the vertical lines but the second one are grounded through one or more of the diodes 26, while the second line can only be grounded through the diode associated with line $h$ and switch $s_2$. The output in line 24 therefore represents the setting of switch $s_2$, which is compared with the signal in line 34 representing the second digit on tape 10, to produce a signal on line 64 if the two digits are not identical, and to thereby actuate flip-flop 41 to its upper state in the event of noncoincidence of the digits. On the next successive clock pulse, the output from the upper state of flip-flop 35 combines with the clock pulse through AND circuit 46 to actuate flip-flop 36 to its upper state, while flip-flop 35 returns to its lower state, to render active only the third vertical line of matrix 20 associated with horizontal line $i$ and switch $s_3$, and to thereby compare the setting of switch $s_3$ with the third digit on the tape. On the next clock pulse, flip-flop 35 is again actuated to its upper state, flip-flop 36 remains in its upper state, and flip-flop 37 remains in its lower state, to activate the fourth vertical line, associated with horizontal line $j$ and switch $s_4$, to thereby compare the setting of that switch and its corresponding digit with the fourth digit on the tape. On the next clock pulse, flip-flop 35 is returned to its lower state, flip-flop 36 is returned to its lower state, and flip-flop 37 is actuated to its upper state by a combination of signals from the upper states of flip-flops 35 and 36 and a clock pulse through AND circuit 47. Similarly, on the next four clock pulses, the flip-flops 35, 36 and 37 successively sequence through or activate the vertical lines associated with switches $s_5$, $s_6$, $s_7$, and $s_8$, to complete a comparison of the first eight digits of the first digital word on the tape with the settings of switches $s_1$ through $s_8$. At the end of this sequencing operation, all of the flip-flops 35, 36 and 37 will be in their upper states, so that the outputs from those states will combine with the next successive clock pulse, through AND circuit 48, to produce a signal in line 65, which signal combines with a signal derived from the lower state output of flip-flop 39, through an AND circuit 53, to apply a clock pulse to flip-flop 39 actuating that flip-flop to its upper state. This disconnects line 17 from ground through flip-flop 39, and the output from the upper state of flip-flop 39 combines in AND circuit 52 with an output from the lower state of flip-flop 38 to connect line 18 and the second set of switches $s_9$ through $s_{16}$ to ground. It will also be noted that the final clock pulse which is associated with the eighth digit on tape 10 acts to return all of the three sequencing flip-flops 35, 36 and 37 to their lower states to commence another sequencing operation.

At the time that the ninth digit in the first digital word on tape 10 is received, the flip-flops 35, 36 and 37 are all therefore in their initial lower states in which they cause diode matrix 20 to sense the grounded or ungrounded condition of horizontal line $g$, which in this instance can only be grounded through switch $s_9$ and line 18, rather than through switch $s_1$ and line 17. Thus, the ninth digit on the tape is compared with the digit represented by the setting of switch $s_9$, followed by comparison of the next eight digits with the settings of switches $s_{10}$, $s_{11}$, etc. through switch $s_{16}$, by the same sequencing operation discussed in connection with the first eight digits. If a signal is produced in line 64 during scanning of these second eight digits, representing dissimilarity of one of the digits on the tape with the corresponding digit represented by one of the switches, the signal in line 64 will combine with the output from the upper state of flip-flop 39, through AND circuit 54, to cause actuation of flip-flop 40 to its upper state on the next successive clock pulse. After scanning the second eight digits, AND circuit 48 is again actuated, and this time its output combines with the output from the upper state of flip-flop 39, through AND circuit 49, to clock flip-flop 38 from its lower state to its upper state, and consequently ground line 19, through AND circuit 51, while disconnecting line 18 from ground. The third group of eight switches $s_{17}$ through $s_{24}$ are thus rendered active, so that on the next scanning operation caused by flip-flops 35, 36 and 37, and matrix 20, the positions of switches $s_{17}$ through $s_{20}$ will be compared with the third eight digits of the first word on tape 10. If there is any dissimilarity between any two of these corresponding digits, the resultant signal in line 64 will actuate flip-flop 40 to its upper state, as previously discussed.

After the final digit of the first word on tape 10 has been compared with the digit represented by the setting of switch $s_{24}$, the final clock pulse of this scanning operation causes actuation of AND circuit 48, which acts through AND circuit 49 to return flip-flop 38 to its lower state, and acts through AND circuit 50 to apply a clocking pulse to flip-flop 42 serving to actuate that flip-flop to its upper state if both of the flip-flops 40 and 41 are still in their lower states, in which event they produce outputs which combine through AND circuit 56 to produce the signal causing such actuation of flip-flop 42 to its upper state. This actuation of the flip-flop to its upper state is indicated by indicator 62, to show that the initial word 28 on tape 10 corresponds exactly to the word represented by the setting of switches $s_1$ through $s_{24}$, as determined by the word supplied through source 16. The word end SIGNAL from gate 50 is also applied to OR-gate 320 through a short delay 321 to reset flip-flop 40 to its lower position ready to record the comparison of the next word after the comparison of the flip-flops 40 and 41 has been registered on flip-flop 42.

After one full word has been scanned in this way, if there is no key pulse 33 then present on tape 10 before the next successive word 30, the apparatus of FIG. 1 does not return completely to its original condition, but rather remains in a condition in which flip-flop 39 is in its upper state, so that line 17 is ungrounded, while line 18 is grounded through AND circuit 52 and the upper state of flip-flop 39, and line 19 of course is ungrounded. In this condition, the apparatus functions to compare the first digit of word 30 on the tape with the digit represented by the setting of switch $s_9$, and then compares the succeeding seven digits with the settings of switches $s_{10}$ through $s_{17}$, followed by comparison of the next eight digits with the settings of switches $s_{17}$ through $s_{24}$, all in the same manner discussed in connection with scanning of the the last 16 digits of the first word 28. If there is dissimilarity between any two of the compared digits, this will be indicated by actuation of the flip-flop 40 to its upper state, so that flip-flop 42 will remain in its lower state, unless all of the 16 digits of the second word 30 are identical with the digits represented by the settings of switches $s_9$ through $s_{24}$ (and the first eight digits of the related and preceding key word 28 (FIG. 2) are also identical with the settings of the switches $s_1$ through $s_8$ ). In the same way, all of the additional words of the first family on the tape, through word 31 of FIG. 2, are compared with the last 16 switches, to see if any of these words are identical with the word represented by the settings of the switches.

After a complete family of words has been scanned in this manner, another key signal 33 on the tape actuates all of the flip-flops except number 42 to their lower states, so that for the next word on the tape the apparatus will scan through all 24 of the switches $s_1$ through $s_{24}$ sequentially, and compare the settings of those switches with the next 24 successive digits on the tape representing the first word 32 of the second family. Remaining words of that second family, having an initial eight digits identical with the first eight digits of the first word of the family, will have only their last 16 digits written on the tape, and will be compared with the settings of only the last 16 switches $s_9$ through $s_{24}$, as discussed in connection with the first family of words. In this same way, throughout the list written on the tape, each time there is a key signal 33, the apparatus will automatically function to scan all 24 of the switches for the next successive word on the tape, and will then scan only the last 16 switches for other incompletely written words in the same family. Of course, it will be apparent that some families may consist of only a single word, in the event that there are no other words in the list having the same first eight digits.

After the entire tape has been scanned, if any one of the words represented on the list is identical with the word represented by the settings of switches $s_1$ through $s_{24}$, that fact will be indicated by actuation of indicator light or signal 62. Otherwise, if flip-flop 42 remains in its lower state, and indicator 62 is unactuated, this condition of the apparatus will indicate that none of the words in the list carried by tape 10 corresponds with the word applied by source 16 to switches $s_1$ through $s_{24}$.

Figure 4:
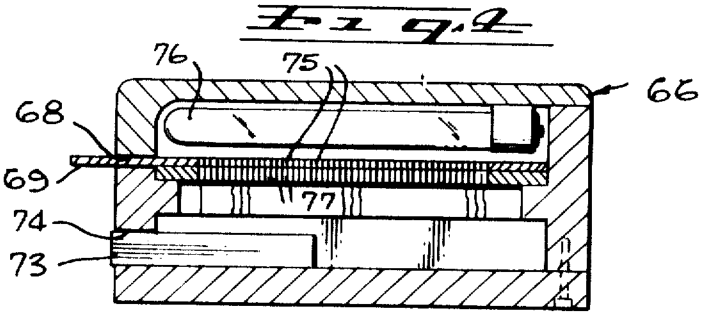
FIG. 4 is an enlarged transverse section taken on line 4—4 of FIG. 3.
Figure 5:
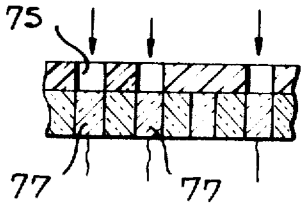
FIG. 5 is a further enlarged representation of the optical switch assembly of FIG. 4.

With reference now to FIGS. 3 to 5, these figures show one type of device which may incorporate and utilize the list scanning and checking circuitry of FIG. 1, or other similar circuitry embodying the invention. Specifically, the device 66 of FIGS. 3 to 5 may serve to perform the function of the structures disclosed and claimed in my U.S. Pat. No. 3,048,097, for checking credit cards at service stations or the like to determine whether a particular card being presented by a customer is one of those on a list of cards which are not to be given credit.

As seen best in FIG. 3, the device 66 includes a body or housing 67 which may have a slot 68 at one side into which a credit card 69 is inserted, and may have a slot 70 at another side into which a sales slip 71 may be inserted for coaction with the credit card. Printing mechanism 72 is provided within the housing 67, and of any conventional type, for printing onto sales slip 71 at the time of a sale information designating the particular service station making the sale, as well as information from the credit card designating the purchaser and the credit card number, as well as any other desired information such as the date, etc. In addition to these conventional elements of a device of this type, housing 67 also carries means for reading the credit card number, preferably in binary form from the card, and means for comparing a list of black listed numbers therewith. The list may typically be carried on a magnetic tape corresponding to that designated by the number 10 in FIGS. 1 and 2, and carried within a tape cartridge or cassette 73 which may be slipped into housing 67 through a slot 74, and to the position designated in FIG. 4, in which it coacts with a drive mechanism of conventional type serving to advance the tape at a proper speed and through a predetermined scanning cycle, past reading head 13, each time that the start-ing signal represented at 63 in FIG. 1 is applied.

The binary number or word constituting the number of the particular credit card 69 being presented may be indicated on the card as a series of apertured and unapertured areas 75 extending across the card. Where 24 digit numbers are employed, as in FIG. 1, there may be 24 locations at which apertures may be provided on the card. The presence of an aperture at one of these locations may represent either a one or a zero at that point in the binary number, with this digit representation being readable optically as a result of transmission or nontransmission of light from an elongated electric lamp 76 downwardly through the card to a series of light responsive cells 77 mounted beneath the card at 24 locations spaced in correspondence with the 24 possible positions of apertures in the card. Each of these cells 77 may be rendered conductive by impingement of light thereon through an aperture 75 located thereabove, or may be rendered nonconductive as a result of the absence of an aperture at that location. As will be apparent, the light responsive cells 77 may then serve as switches $s_1$, $s_2$, $s_3$, etc. of FIG. 1, and may be connected into the circuitry of FIG. 1, or similar circuitry, to provide for comparison of the card number with the various numbers listed on the tape within cassette 73, to determine whether the number of the card is carried on the list. The indicator unit 62 of FIG. 1 may serve when actuated to illuminate a reject indicator window 78 on housing 63 of FIG. 3, or otherwise provide a visual or audible indication that the particular card 69 presented by a customer should not be ... ing the card. The apparatus of FIG. 3 is so designed that, as soon as a card 69 and sales slip 71 are inserted into position, the printing apparatus 72 automatically performs its printing function, lamp 76 is automatically energized, and the tape within cartridge 73 is automatically advanced through its predetermined list reading cycle of operation, to either indicate rejection or nonrejection of the card at 78.

Figure 6:
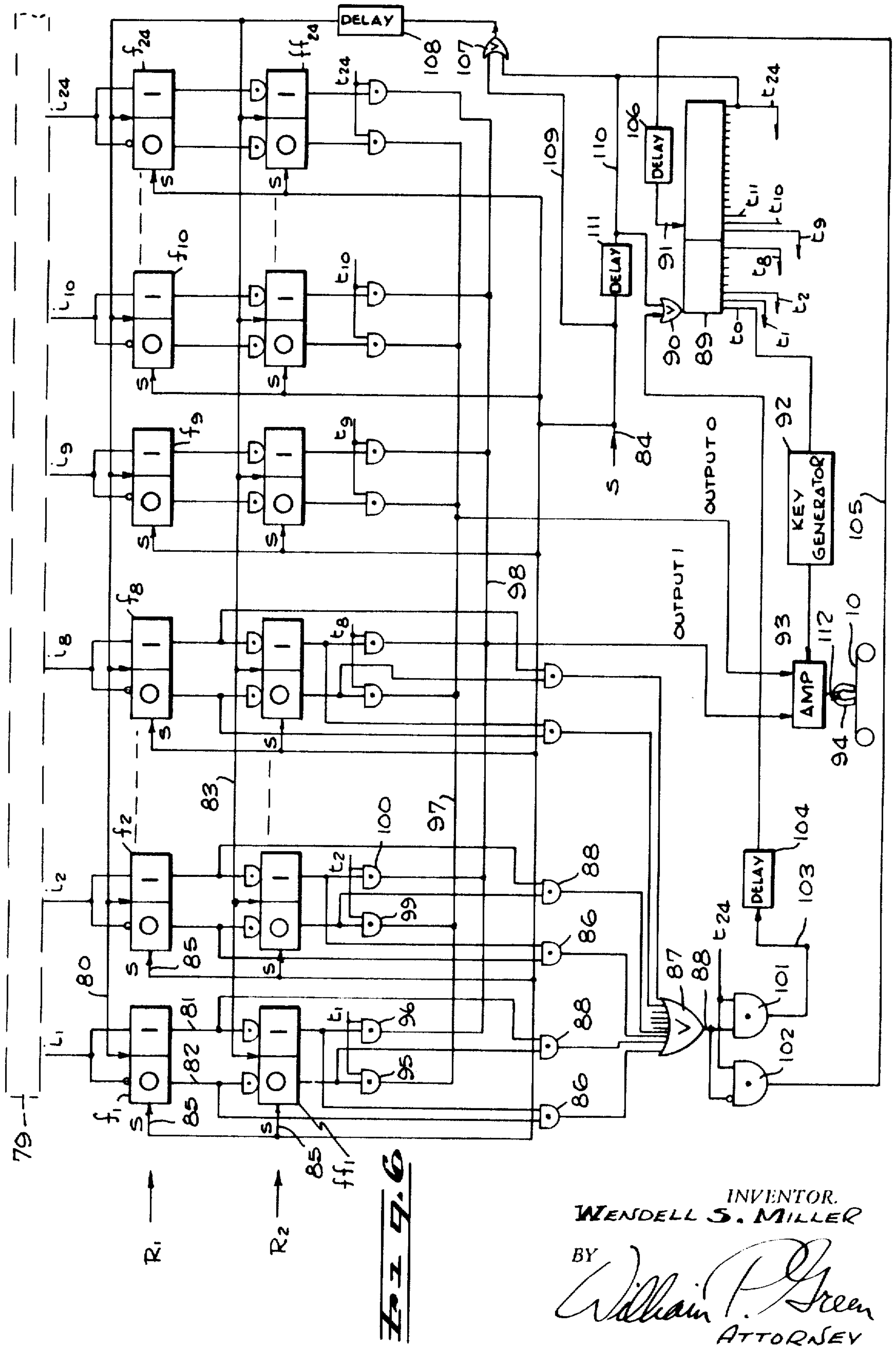
FIG. 6 illustrates diagrammatically a circuit for writing the list which is scanned in the equipment of FIG. 1.

FIG. 6 illustrates one type of circuitry which may be employed for writing the compacted list and associated key signals of FIG. 2 onto the tape 10 or other record medium, for ultimate scanning and comparison in the apparatus of FIGS. 1 to 5. In FIG. 6, it is assumed that the digital words to be listed are supplied to the circuitry sequentially and in their entirety by an appropriate source diagrammatically represented at 79, and typically constituting a computer circuit, key operated input, or the like. As in FIGS. 1 to 5, it is assumed in FIG. 6 that the individual words have 24 digits, preferably binary, though of course any number or type of digits may be employed to constitute the words. When 24 binary digits are utilized, data source 79 is assumed to have 24 parallel lines $i_1$, $i_2$, $i_3$, through $i_{24}$ which carry signals representing ones and zeros at the particular digit locations respectively. These input lines may carry their respective signals simultaneously to a series of clocked master slave flip-flops $f_1$, $f_2$, etc. through $f_{24}$, constituting a holding register $R_1$. If it is assumed that presence of a particular signal on one of the input lines represents a one for the corresponding digit, then the presence of that signal on the input line will serve to actuate the flip-flop to its one-indicating or right-hand state upon receipt of the next clocking signal through line 80 of FIG. 6. The absence of such a one-indicating signal actuates the flip-flop to its zero-indicating or left-hand state upon reception of the next clocking signal through line 80. The one and zero outputs 81 and 82 of the different flip-flops of register $R_1$ are fed into the input sides of a second series of clocked master slave flip-flops $ff_1$, $ff_2$, etc. through $ff_{24}$ respectively, which constitute a second or working register $R_2$. Clocking pulses are supplied to these flip-flops of register $R_2$ through a line 83 simultaneously with one another and with the application of clocking pulses to the flip-flops of register $R_1$ through line 80. Thus, at any one time, the settings of the 24 flip-flops of register $R_2$ represent the 24 binary digits of a first word to be listed on tape 10, while the settings of the 24 flip-flops of register $R_1$ represent the 24 digits of the next successive digital word supplied by source 79 and to be listed on tape 10. At the commencement of a cycle of operation, for writing the list on tape 10, all of the flip-flops of the two registers $R_1$ and $R_2$ are actuated to their zero-indicating states by a start signal from a line 84 delivered to the flip-flops through individual overriding input lines 85.

In order to predetermine automatically whether a particular word which is held in register $R_1$ is to be written in its entirety onto tape 10, or is to be written only partially, deleting the first eight digits of the word, the circuitry of FIG. 6 is designed to compare those first eight digits of the word in register $R_1$ with the corresponding first eight digits of the preceding word within register $R_2$. More particularly, there is associated with each of the first eight pairs of corresponding flip-flops of the two registers a first AND circuit 86 which receives signals from the zero-indicating output of the $R_1$ flip-flop and from the one-indicating output of the corresponding $R_2$ flip-flop and delivers a signal to an OR circuit 87 if the flip-flop of register $R_1$ is in its zero state, and the corresponding flip-flop of register $R_2$ is in its one state. Similarly, each of the first eight pairs of corresponding flip-flops has associated with it a second AND circuit 88, for delivering a signal to OR circuit 87 if the flip-flop of register $R_1$ is in its one-indicating state and the corresponding flip-flop of register $R_2$ is in its zero-indicating state. Thus, if there is a difference between any of the first eight digits in register $R_1$ and the corresponding digit of register $R_2$, a signal is supplied to OR circuit 87, which produces an output from that circuit at 88. This output is utilized in a manner to be discussed later for determining whether all or only part of the word in register $R_1$ is eventually written onto the tape.

For controlling the sequential timed writing of the digits in register $R_2$ onto tape 10, I utilize an appropriate sequential 24 device 89, which may typically be a usual sequencing counter. This counter acts when energized by an input pulse from an OR circuit 90 to advance sequentially through a series of positions or settings producing outputs first through an initial output line $t_0$, and then successively and at timed intervals through a series of outputs $t_1$, $t_2$, etc. through $t_{24}$, associated with the 24 flip-flops respectively of register $R_2$. The $t_0$ output may occur immediately upon application of the input signal through OR circuit 90. A second input 91 to sequencing counter 89 acts upon application of a signal thereto to commence timed operation of the counter with production of an output signal through line $t_9$, and then at timed intervals to produce outputs $t_{10}$, $t_{11}$, etc. through $t_{24}$, for writing only the last 16 digits of a particular word.

Energization of output line $t_0$ from the sequencing counter actuates a key signal generator 92 to feed to amplifier 93 a key signal, to then be applied through recording head 94 to tape 10 as one of the key signals 33 of FIG. 2. The subsequent energization of line $t_1$ supplies signals to two AND circuits 95 and 96, whose second inputs lead from the zero and one-indicating outputs respectively of the first flip-flop $ff_1$ of register $R_2$, to thus produce an output in a line 97 if flip-flop $ff_1$ is in its zero-indicating state, and produce an output in line 98 if flip-flop $ff_1$ is in its one-indicating state. These output signals are delivered from lines 97 and 98 to the input side of amplifier 93, to actuate the amplifier and head 94 for recording either a zero or one on the tape representing the first digit of a particular word. After such recording of the first digit, the signal on line $t_1$ from the sequencing counter is interrupted and the next successive signal from the counter is applied to line $t_2$, which actuates one of two AND circuits 99 or 100 to read out a zero or one to line 97 or 98 leading to the amplifier, and thus record on the tape the second binary digit. Similarly, the sequencing counter advances through all of the different positions up to $t_{24}$, to successively record all 24 digits of the word in register $R_2$ onto the tape.

Actuation of the final output line $t_{24}$ of the counter supplies input signals to an AND circuit 101 and an INHIBITED AND circuit 102, to produce a signal in line 103 if OR circuit 87 indicates a difference between any one of the first eight corresponding pairs of flip-flops of registers $R_1$ and $R_2$. This signal in line 103 acts through a delay circuit 104 to supply a slightly delayed input to OR circuit 90, for commencing another complete cycle of operation of sequencing counter 89, through all of its positions from $t_0$ to $t_{24}$, to thus write the next successive word in its entirety onto the tape. If there is no difference between the settings of the first eight flip-flops of register $R_1$ and the corresponding flip-flops of register $R_2$, the lack of an output from OR circuit 87 combines with the signal from line $t_{24}$ to produce an output in a line 105, which after a predetermined delay produced by a delay circuit 106 supplies an input signal in line 91 causing the counter to commence a partial cycle of operation beginning with production of an output in line $t_9$, and advancing through line $t_{24}$, to thereby record on tape 10 only the last 16 digits of the next successive word.

The production of a signal on line $t_{24}$, at the end of each cycle of operation of the sequencing counter 89, also acts through an OR circuit 107, and a delay circuit 108, to supply a slightly delayed clocking signal to lines 80 and 83, serving to advance the word previously held in register $R_1$ to the next register $R_2$, and causing a new word from input lines $i_1$, $i_2$, etc. to be registered in $R_1$. OR circuit 107 and delay circuit 108 are also actuable to advance the registers upon receipt of a signal through a line 109 from start signal source 84, and subsequently by reception of a signal through a line 110 from a delay circuit 111 whose delay interval is commenced by the signal in start line 84.

To now recapitulate a cycle of operation of the apparatus of FIG. 6, application of a starting signal to line 84 acts through overriding input lines 85 to first actuate all of the flip-flops of the two registers to their zero-indicating states. The same signal acts through line 109, OR circuit 107 and delay circuit 108 to advance a first 24 digit binary word from input lines $i_1$, $i_2$, etc. into the 24 flip-flops of holding register $R_1$. Following a short delay interval from the application of the starting signal, delay circuit 111 acts through OR circuit 90 to commence a cycle of operation of sequencing counter 89 through its various positions from $t_0$ to $t_{24}$, and acts through OR circuit 107 and delay circuit 108 to apply a second clocking signal to all of the flip-flops, to advance the first word into register $R_2$, and advance a next successive word into register $R_1$. The sequencing counter in its first position $t_0$ causes key signal generator 92 to record a key signal onto tape 10 (signal 33 of FIG. 2). By the time the sequencing counter applies a signal to the next successive line $t_1$, the delay interval of circuit 108 has been completed, and the second word has been advanced into register $R_1$, as discussed. Thus, the signal from line $t_1$ reads out through AND circuits 95 and 96 the position of flip-flop $ff_1$, to write either a one or a zero onto the tape, following the key signal, and representing the first digit of the word in register $R_2$. In the same manner, and as previously discussed, the counter 89 advances through its various positions $t_2$, $t_3$, etc., to write onto the tape all of the remaining digits of the word in register $R_2$. At the end of this word, the signal from line $t_{24}$ acts through circuit 101 or 102 to commence a second cycle of operation of the counter either at $t_0$ or at $t_9$, depending upon whether OR circuit 87 indicates that the first eight digits of the two words in the registers are identical or different from one another. If they differ, a signal delivered to the counter through OR circuit 90 causes a new key signal and 24 digits to be written onto the tape, whereas if the first eight digits of the two words are identical with one another, a signal through line 91 causes the counter to write onto the tape only the last 16 digits of the next successive word. The delay interval introduced by delay circuit 106 is in this case sufficient to enable circuit 108 to advance the words in the registers through one step prior to reading out of the digit from the ninth flip-flop $ff_9$ of register $R_2$ by line $t_9$ from the counter.

It will thus be seen that each time that the particular word being written onto the tape has an initial eight digits which are identical with the preceding word, only the last 16 digits of that particular word will be written onto the tape, without a key signal, thus indicating that the word is in the same 'family' as the preceding word or words. Conversely, if a particular word has an initial eight digits which are different from the first eight digits of the preceding word, then the particular word in question will be written in its entirety, and will be preceded by a key signal, to which the circuitry of FIG. 1 may respond, as discussed.

Figure 7:
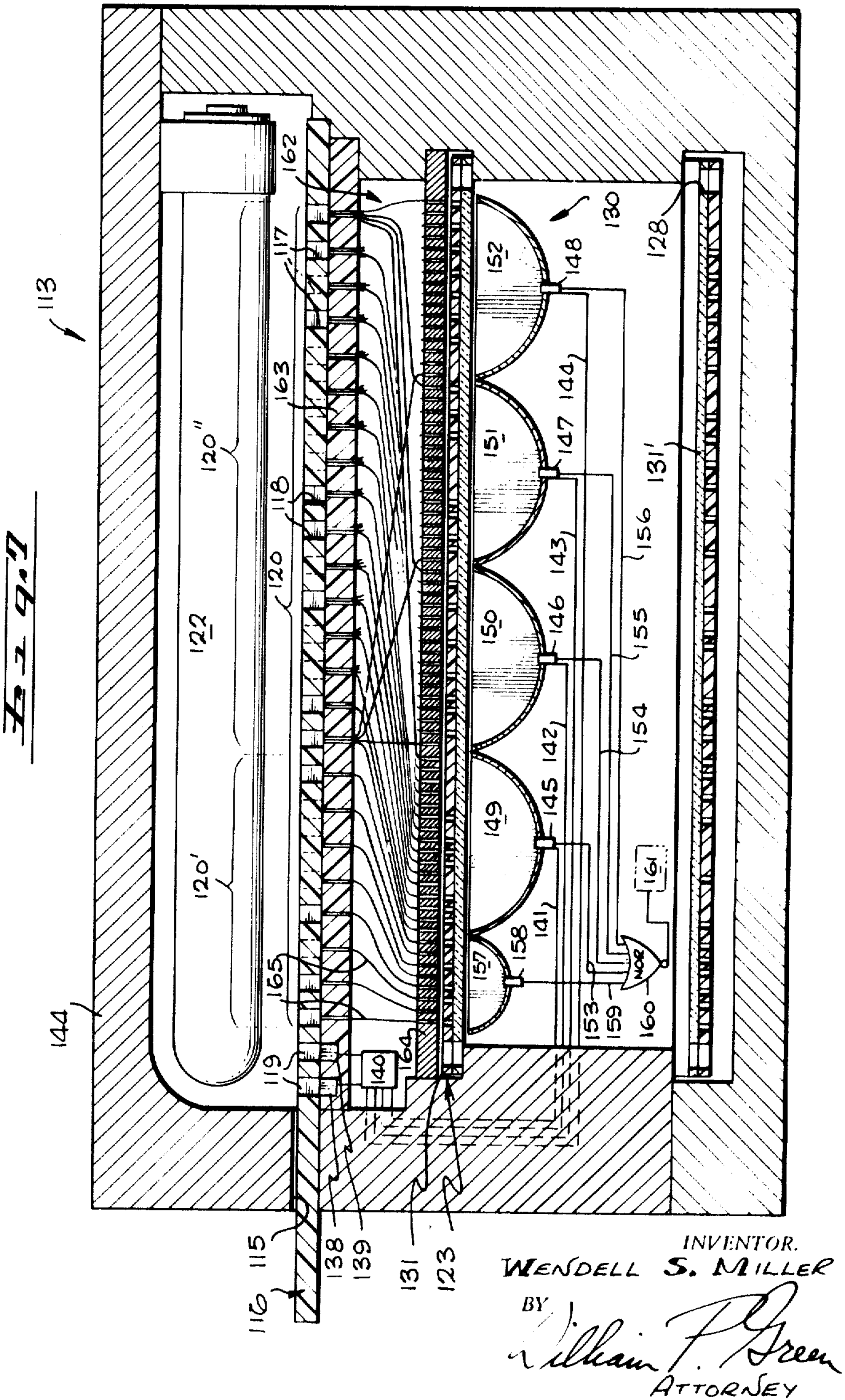
FIG. 7 is a vertical section similar to FIG. 2 through a variational card-checking device.
Figures 8, 9:
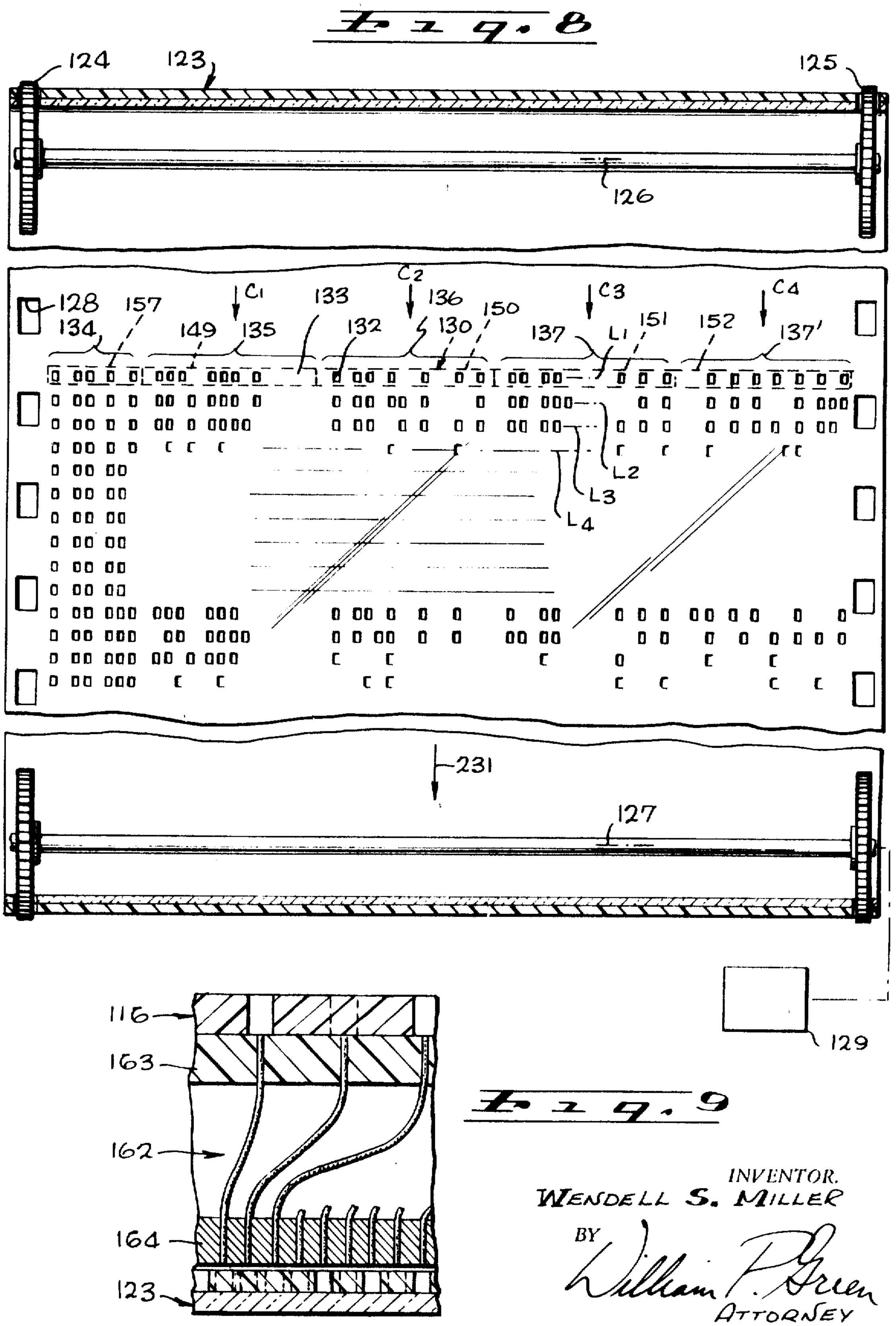
FIG. 8 is a horizontal section taken on line 8—8 of FIG. 7.
FIG. 9 is an enlarged detail view showing a portion of FIG. 7.

FIGS. 7 through 9 show a variational type of comparing system utilizing compacted families of digital words similar in some respects to the word families discussed in connection with FIGS. 1 to 6, and with this variational type of comparing system typically being illustrated in FIGS. 7 through 9 as applied to a card-checking system intended for the same general purpose as that shown in FIGS. 3 and 4.

With particular reference first to FIG. 7, the device 113 there illustrated has a rectangular hollow housing 114 essentially the same as housing 67 of FIG. 2, with this housing containing a side slot 115 similar to slot 68 of FIG. 2 and into which a credit card 116 is insertable to the reading position illustrated in FIG. 7. At its end, housing 114 may contain a slot such as that shown at 70 in FIG. 2, into which a sales slip such as that shown at 71 in FIG. 2 may be inserted, and with printing mechanism of the type represented generally at 72 in FIG. 2, and discussed above, also being provided within housing. FIG. 7 may be considered as taken through the housing in a transverse vertical plane corresponding to the plane of FIG. 4.

Credit card 116 has a series of aligned locations 117 at which light-passing apertures 118 may or may not be provided, as a representation of a series of digits characteristic of the particular credit card. Preferably, the first two of these possible aperture locations, which two are designated 119 in FIG. 7, represent the first two binary digits of the particular credit card number but are utilized as control signals in a manner to be discussed in greater detail at a later point.

The rest of the apertures on the card constitute the remainder of the credit card number, and may be considered as representing a characteristic word which is to be checked against a list of such words, with each aperture in the card designating a binary one or a binary zero as may be desired, and with an unapertured area designating the opposite type of digit. In consistency with the first form of the invention, this binary word 120 on the card is typically assumed to comprise 24 digits, not including the two initial control digits 119. Light is passed downwardly through all of the various apertures in card 116 from a single electrically energized elongated lamp 122 contained within the housing above the card locations.

A list of binary words to be checked against the word 120 on card 116 in FIG. 7 is carried, in optically readable form, on an endless photographic film 123. The endless loop of film 123 may extend at its opposite ends about, and be mounted by, two sprocket wheels 124 and 125 (FIG. 8), suitably journaled in housing 114 for rotation about two parallel horizontal axes 126 and 127. These sprocket wheels have conventional sprocket projections receivable within sprocket openings 128 formed along the opposite side edges of the film, with one or both of the sprocket wheels being suitably driven by an electric motor 129 or otherwise. This motor may be automatically energized upon insertion of card 116 into the FIG. 7 position within the housing to drive the belt along an endless path and past a reading head structure 130, for a period sufficient to move the film through one complete turn and allow all of the families of words written onto the film to be scanned. The reading head structure, as seen in FIG. 7, may be located to view and respond optically to a portion of the upper horizontally advancing run 131 of film 123, with the lower run 131' of the film returning horizontally in the opposite direction at a location beneath the readout head structure 130.

As seen best in FIG. 8, the various binary words which are listed on the film, and are to be scanned for comparison with the word 120 on card 116, are written on a series of lines $L_1$, $L_2$, $L_3$, etc., extending transversely of the direction of advancement 231 of the film, and with corresponding portions of all of the lines being in columnar alignment with one another longitudinally of the film (that is, in the direction of advancement 231 of the film). The individual digits on the various lines $L_1$, $L_2$, etc. are written as either light-passing areas 132 or nonlight-passing areas 133, but with the light-passing or nonlight-passing character having a significance the opposite of that utilized in writing the word 120 on card 116. Thus, if the presence of a light passing aperture in word 120 on the card represents a binary one, then the same binary one is represented as an opaque area on film 123. Also, it is preferred that every word applied at 120 to any of the individual cards 116 utilized in the system, and therefore every word listed on film 123, be of a character having the same number of zeros as ones, in order to enable use of the simplified readout system illustrated in FIG. 7. Therefore, when the individual words all have 24 digits, as assumed in the figures, each of these words will have 12 binary ones and 12 binary zeros, arranged in a pattern characteristic of that particular word.

Each of the lines $L_1$, $L_2$, $L_3$, etc. on the film may represent a family of 24 digit words written in a compacted form similar to that discussed in connection with FIG. 2. More particularly, each of these families is written in compacted form on one of the lines $L_1$, $L_2$, etc. by first writing at the beginning of the line a first group of digits 134 (typically eight such digits which are identical for all members of the family), then writing the last 16 digits of a first member of the family as a second group of digits at 135, then writing the last 16 digits of a second member of the family at 136, and continuing in this manner to write the last 16 digits of each of the remaining members of the family sequentially across the line as a series of groups of 16 digits each. If there are more words to be listed with the same first eight digits than can be accommodated on a single line, then two or more of the lines may have the same initial group of digits, as for instance is the case for lines $L_1$, $L_2$, $L_3$, and $L_4$ in FIG. 8. The first group of eight digits in each line are written directly beneath the corresponding eight digits in the preceding line, in columnar fashion, and the various corresponding groups of 16 digits in the different lines are similarly written directly beneath one another in columnar fashion, to be read successively by the same light responsive readout element.

The initial two digits 119 formed on card 116 are used to indicate which of the 16 digit columns $C_1$, $C_2$, $C_3$, etc. of FIG. 8 would contain the last 16 digits of the word 120 on the particular card in question if that word were included in the list on film 123. These digits 119 therefore control apparatus which renders the readout head structure 130 responsive to only that one selected column of 16 digit groupings on the film, in addition of course to the initial eight digits which are common to all members of the family. If the film has four columns of 16 digit groupings, as shown, all of the cards 116 are divided into four corresponding groups, with the four groups being designated differently in binary fashion by the two digits 119. For example, the four groups may be designated by the binary numbers zero-zero, zero-one, one-zero, and one-one, respectively.

To read out the information conveyed by the first two digits 119 on card 116, there may be provided two light-responsive cells or units 138 and 139, positioned directly beneath the locations of the first two possible aperture areas 119, to each receive light and produce an electrical output if a light-passing aperture is provided at the corresponding location in the card. The outputs of the two cells 138 and 139 are delivered to a switching circuit 140 having four output lines 141, 142, 143, and 144 which control four light responsive transistors or units 145, 146, 147 and 148 respectively. Each of these transistors 145 through 148 is located at the center of a funnellike internally reflective elongated light directing structure 149, 150, 151, or 152, which is positioned and constructed to receive light which passes through any of a predetermined series of the apertures in film 132, and direct that light from any of these apertures onto the associated transistor or other light responsive unit 145, 146, 147 or 148, to actuate that unit and produce an output signal in an associated output line 153, 154, 155 or 156.

As seen best in FIG. 8, all of the light converging units 149 through 152, as well as an additional but smaller internally reflective funnellike light-converging unit 157, are positioned in alignment at any instant to receive light from only a single one of the digit lines on film 123, as for instance the line L. More specifically, unit 157 receives light from the first group of eight digits (134) of that line, and actuates an associated transistor 158 to produce an output in line 159 if light passes through any one or more of the eight possible light-passing locations in that region. Similarly, unit 149 receives light from the first 16 digit group 135 of possible light-passing locations in line L, while units 150, 151, and 152 are adapted to receive light from the remaining 16 digit groups 136, 137 and 137' of FIG. 8. The output lines 153, 154, 155, 156 and 159 from all of the light responsive transistors are directed into a logical NOR circuit 160, whose output is inverted to energize an indicator 161 only if none of the input lines leading to the NOR circuit are energized. The indicator 161 may produce an indication at a location as represented at 78 in FIG. 3, if the digital word 120 on the card corresponds to any of the words represented on the film.

Light is transmitted from the various light-passing apertures in card 116 to corresponding digit locations in a single one of the lines of digits on film 123 by means of a network 162 of optical fibers, typically formed of glass and of a character capable of directing light longitudinally within each fiber between its opposite ends. The upper ends of these fibers are held in fixed positions by an appropriate locating structure 163 mounted in the housing for reception of card 116 directly thereabove, while the lower ends of the fibers are held and located by a similar retaining structure 164 which is received just above the upper run 131 of the film, and which holds the lower ends of the fibers in alignment transversely of the direction of movement of the film, for coaction at any particular instant with a single line of digits on the film. In association with the first eight possible aperture locations in card 116 (the eight locations designated 120' in FIG. 7), there are provided eight individual light-conducting fibers 165, which lead light from the first eight aperture locations in card 116 downwardly through the fibers and to the first eight digit locations on the film, in the particular line of film 123 which is being scanned (the eight locations designated 134 in FIG. 7). If there is an aperture at any of these eight locations on the card, and also is a light-passing area at the corresponding location on the film, light from lamp 122 will pass downwardly through the card aperture, then through the associated fiber 165, and then through the corresponding light-passing area on the film, to impinge upon and actuate light-responsive unit 158.

From the remaining 16 possible aperture locations 117 of card 116 (the locations designated 120'' in FIG. 7), there extend downwardly several sets of optical light-conducting fibers (four sets in the typically illustrated arrangement) leading respectively to the various groups of digits designated 135, 136, 137 and 137' on the film. More particularly, a first set of 16 fibers from the aperture locations 120'' on the card extend downwardly and curve leftwardly to direct light downwardly toward and through the 16 digit locations respectively of the grouping designated 135 on the film of FIG. 8. Similarly, a second set of 16 fibers direct light downwardly to corresponding digit locations in the second group 136 on the film, while two additional groups of fibers direct light from the 16 aperture locations in card 116 to corresponding digit locations in the two final groups of digits 137 and 137' on the film. The emulsion side of the film, which actually contains the light-passing areas representing some of the digits, may be directed upwardly to be in close proximity to the lower ends of the fibers.

To now describe a cycle of use of the unit of FIGS. 7 through 9, assume that the film 123 is in position in the device, and carries a list of digital words in the form illustrated in FIG. 8 and representing the account numbers of credit cards which are not to be honored. If a customer then presents a card 116 with the intention of making a credit purchase, this card is inserted into the housing 114 in the position illustrated in FIG. 7, and printing mechanism 72 of FIG. 2 acts automatically to print information contained in that mechanism, and information from the credit card, onto a sales slip. At the same time, motor 129 of FIG. 8 is automatically energized to advance the film rapidly through one complete turn, to successively scan all of the families or lines of digital words $L_1$, $L_2$, $L_3$, etc. past the lower ends of the fibers in FIG. 7, and past the readout head structure 130 consisting of the various reflectors 149, etc. and their light-responsive elements 145, etc. Prior to actual energization of motor 129, light passing through apertures at one or both of the locations 119 in FIG. 7 actuates the corresponding unit or units 138 and/or 139, and acts through switching unit 140 to energize one of the lines 141, 143 or 144, and to thereby condition the associated transistor 145, 146, 147 or 148 for production of an output in its line 153, 154, 155 or 156 in response to impingement of light upon that transistor. The other three of these transistors remain ineffective to produce any output even though light may fall on those transistors. In this way, the two keying or control digits 119 effect a selection as between the four different columns of 16 digit groupings 135, 136, 137 and 138 of FIG. 8, and select for scanning only the particular column within which that particular card 116 would be listed if it is listed at all. If desired, mechanical or other switches may be substituted for the light responsive units 138 and 139, to be actuated mechanically by projections or recesses or the like within card 116, rather than being actuated optically as described.

As the upper run 131 of film 123 advances past the readout location in the plane of FIG. 7, light passes downwardly from lamp 22 to the underside of the film at every location where there is a light-passing area in the film positioned in correspondence with an aperture in card 116 to which the light-passing area is connected by one of the fibers. Since, as previously indicated, the words are written reversely on the film as compared with the various cards 116 used in the system, that is, with a binary one being represented by a dark area on the film if a binary one is represented by a light-passing aperture in the card, and vice versa, and since every word is so selected as to have exactly as many light-passing areas as dark areas, there will always be one or more locations at which light can pass downwardly through both the card and film, and the associated fibers, to either the light-responsive transistor 158, or the energized one of the other four transistors 145, 146, 147 or 148, except in the single instance in which the word represented at card 116 corresponds exactly to the word represented by the eight digits to which unit 158 is responsive, and the 16 digits to which the energized one of the other four transistors is responsive. When the word written on the card does in this way correspond exactly to one of the words written on the film, the first eight digits of the word on the card will have light-passing areas wherever the first eight digits on the particular line of the film being scanned have darkened areas, and vice versa, and similarly the last 16 digits on the card will have light-passing areas wherever the effective or selected one of the 16 digit groups on the film has darkened areas, and vice versa, to thereby prevent delivery of any output from the transistors to NOR circuit 160. In that event, and only in that event, NOR circuit 160 produces an output for actuating indicator 161, to indicate to the operator of the device that the credit card 116 has been black-listed and is not to be honored. The device scans through all of the families of words on the film sequentially, and indicates to the user if any one of the words listed on the film corresponds to the word on the card.

While I have disclosed certain typical embodiments of the invention. it will be apparent that the board concepts of the invention can be utilized in many variational arrangements, without departing from the scope of the invention as defined in the claims. For example, to mention a few but not all of the possible variations, many conventional types of circuitry may be substituted for the particular circuit arrangements shown in the drawings, and as indicated previously the number of digits in the individual words may be altered, as may the number of digits which are written when an incomplete word is recorded on the record medium. Further, the particular digits of successive words which are compared and then omitted if identical may not be an initial portion of the word, but rather may comprise any selected group of digits occurring at any predetermined location within the word. It is also contemplated that the decision as to whether to omit a portion of a word in the FIG. 6 arrangement or a variation thereof need not in every instance be made at only a single point in the word, as between including or excluding the first eight digits in the particular form of the invention illustrated, but rather may be made at two or more locations, so that different numbers of the digits may be deleted in different words, with the appropriate key signals indicating how many have been deleted in a particular word. In its broadest aspects, this form of the invention contemplates an arrangement in which complete flexibility would allow deletion of any number of digits which may in a particular word be identical with another compared or parent word, with key signals indicating for each word the extent of the deletion. Instead of the optical card reading arrangement of FIG. 3, any other convenient way of writing and responding to the words or numbers on the card or other control element may be employed.

Another variational arrangement, which will be so apparent from the drawings as to obviate the necessity for further illustration, is one in which, instead of recording the list produced in FIG. 6 on a tape, and then utilizing that tape in the apparatus of FIG. 1, the circuits of FIGS. 6 and 1 (or other 'write and read' circuits embodying the invention) are connected directly together so that the FIG. 1 circuit scans and responds to the list at the same time that it is being formed by the FIG. 6 circuit. Such an arrangement may be produced by merely connecting the output line 112 from amplifier 93 in FIG. 6 directly into the input side of amplifier 15 in FIG. 1, so that instead of recording the key signals and digital data from amplifier 93 onto tape 10, those signals and that data pass directly into amplifier 15 of FIG. 1, and are handled by the circuitry of that figure instantaneously, for comparison with the word written into switches $s_1$, $s_2$, etc. by a card such as that shown at 69 in FIG. 3, or other control element or source as represented at 16 in FIG. 1.

I claim:

1. Data-processing apparatus comprising first input means actuable to a condition representing a predetermined first word including a series of digits, second input means for receiving information representing a list of digital words with portions of some words omitted where said portions are identical with corresponding portions of other words and with key signals indicating when such omissions do and do not occur, and means for comparing said predetermined first word with said words of said list sequentially and indicating whether said first word corresponds to a word represented on said list, said comparing means including means responsive to said key signals to actuate said comparing means between a first condition in which all of the digits of said first word are compared with individual digits in said list and a second condition in which only some but not all of the digits of said first word are compared with a series of digits on said list representing a portion of a word.

2. Data-processing apparatus as recited in claim 1, in which said second input means include means for reading back a record track having said list and key signals recorded thereon.

3. Data-processing apparatus as recited in claim 1, in which said first input means include a series of switches whose settings represent said digits respectively of said first word.

4. Data-processing apparatus as recited in claim 1, including means for holding a card which carries indicia representing said digits of said first word, said first input means including switch means actuable by said indicia on said card to conditions representing said first word.

5. Data-processing apparatus as recited in claim 1, in which said first input means include a series of switches whose settings represent said different digits respectively of said first word, said comparing means including sequencing circuitry for comparing the settings of said switches sequentially with successive digits of a word of said list and indicating whether there is any difference in the digits represented.

6. Data-processing apparatus as recited in claim 1, in which said first input means include a series of switches whose settings represent said different digits respectively of said first word, said comparing means including a switching matrix having a series of circuits responsive to different ones of said switches respectively, and sequencing means for sequentially sampling said circuits and comparing them with successive digits of a word on said list.

7. Data-processing apparatus as recited in claim 1, in which said first input means include a series of switches whose settings represent said different digits respectively of said first word, said comparing means including a switching matrix having a series of circuits responsive to different ones of said switches respectively, and a plurality of flip-flops connected together into a sequencing unit for sequentially sampling said circuits and comparing them with successive digits of a word on said list.

8. Data-processing apparatus comprising a series of switches actuable to different conditions representing a series of digits respectively of a predetermined first word, input means for receiving information representing a list of words each including a series of digits and having key signals associated with some of the words but not others, sequencing and comparing circuitry operable through a first cycle to compare a first series of said switches sequentially with a series of digits of a word in said list, and then operable through an additional cycle or cycles to compare one or more additional series of said switches with additional digits of said word in the list, means responsive to said circuitry for indicating whether or not said first word as represented by said switches is identical with a word represented on said list, and means responsive to said keys signals to actuate said sequencing and comparing circuitry between a first condition in which said circuitry sequences through and compares said first series of switches and then the remaining switches and a second condition in which said circuitry sequences through only said remaining switches and omits said first series thereof.

9. Data-processing apparatus as recited in claim 8, in which said last mentioned means include means responsive to a key signal preceding a word on said list to cause said circuitry to sequence through all of said switches for said word, said circuitry being operable in the absence of a key signal before a word to omit said first series of switches and sequence through only the remaining switches.

10. Data-processing apparatus are recited in claim 8, in which said sequencing and comparing circuitry includes a diode matrix having lines associated respectively with the switches in said first series and with the switches in each additional series, a plurality of flip-flops for sequencing through said lines of the diode matrix, additional flip-flop means for sequentially connecting said different series of switches to said matrix to first scan through said first series and then said additional series, said means responsive to said key signals being operable upon receipt of a key signal to actuate said additional flip-flop means to scan through all of said series of switches, said additional flip-flop means being operable in the absence of a key signal to omit said first series of switches and sequence through only the remaining switches.

11. Data-processing apparatus as recited in claim 10, in which said input means include record playback means for reading said digits of said list of words and said key signals from a record track.

12. Data-processing apparatus comprising means forming a list of digital words to be compared with a particular digital word, said list containing a plurality of families of words written in compacted form as one group of digits which are identical in the different words of a family and a plurality of additional groups of digits constituting dissimilar other portions of the words of said family, and means for comparing one portion of said particular word with said one group of digits of a family in said list, and comparing another portion of said particular word with one of said additional groups of digits in the same family.

13. Data-processing apparatus as recited in claim 12, including an element carrying said particular word for comparison with said list.

14. Data-processing apparatus as recited in claim 12, including an element carrying said particular word and also carrying additional data, there being means responsive to said additional data to select which of said additional groups of digits in a family is compared with a portion of said particular word.

15. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas.

16. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said means for passing light through said areas including optical fibers for directing light between corresponding areas of said element and said list.

17. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said means for passing light through said areas including a plurality of sets of optical fibers for directing light between corresponding areas of said element and said list, different sets of said fibers being in light-transmitting relation with the same group of areas on said element but with different groups of areas on said list representing different ones of said additional groups of digits.

18. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said means for passing light through said areas including a plurality of sets of optical fibers for directing light between corresponding areas of said elements and said list, different sets of said fibers being in light-transmitting relation with the same group of areas on said element but with different groups of areas on said list representing different ones of said additional groups of digits, there being an additional set of said optical fibers optically connecting said one group of digits of a family on said list and corresponding digit of said particular word on said element.

19. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said light-responsive means including different light responsive units associated with said different groups of digits respectively of said list and each operable to respond to passage of light through any area representing any digit of the corresponding group.

20. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said light responsive means including different light responsive units associated with said different groups of digits respectively of said list and each operable to respond to passage of light through any area representing any digit of the corresponding group, and means responsive to said light-responsive units for indicating when there is correspondence between said particular word on said element and the groups of digits of said list compared therewith.

21. Data-processing apparatus as recited in claim 12, including an element carrying said particular word, said digits being written as light-passing and nonlight-passing areas on said element and on said list, said comparing means including means for passing light through corresponding light-passing areas of said element and said list, and means for responding differently to the passage or nonpassage of light through said areas, said light-responsive means including different light-responsive units associated with said different groups of digits respectively of said list and each operable to respond to passage of light through any area representing any digit of the corresponding group, and means responsive to selection control data on said element to render a particular one of said light-responsive units effective for indicating whether light is received thereby.

22. Data-processing apparatus as recited in claim 12, in which said means forming said list include a film having light-passing and nonlight-passing areas representing said digits.

23. Data-processing apparatus as recited in claim 12, in which said list includes a series of said families of words with different families written on different successive lines of the list, there being means for relatively moving said list and said comparing means to advance said different lines successively past said comparing means.

24. Data-processing apparatus as recited in claim 12, in which said list includes a series of said families of words with different families written on different successive lines of the list, there being means for relatively moving said list and said comparing means to advance said different lines successively past said comparing means, said one group and said additional groups of digits of the different families being arranged in a plurality of columns, said comparing means including different comparing structures associated with said different columns respectively and enabling selection of any one of said columns for comparison with a portion of said particular word.

25. Data-processing apparatus as recited in claim 12, in which said list includes a series of said families of words with different families written on different successive lines of the list, there being means for relatively moving said list and said comparing means to advance said different lines successively past said comparing means, said one group and said additional groups of digits of the different families being arranged in a plurality of columns, said comparing means including different comparing structures associated with said different columns respectively and enabling selection of any one of said columns for comparison with a portion of said particular word, and means responsible to control data associated with said particular word for actuating said different comparing structures to select a predetermined one of said columns for comparison with said particular word.

26. Data-processing apparatus as recited in claim 12, in which said means forming said list include a film having light-passing and nonlight-passing areas representing said digits, there being an element carrying said particular word written in the form of light-passing and nonlight-passing areas and also carrying additional control data, said list including a series of said families of words with different families written on different successive lines of the list, there being means for moving said film relative to said comparing means to advance said lines successively therepast, said one group and said additional groups of digits of the different families being arranged in a plurality of columns, means for directing light through corresponding light-passing areas in said element and said film, a first set of optical fibers for conducting said light between said one group of digits in a particular family on said film and the corresponding digits of said particular word, a plurality of additional sets of optical fibers for conducting light between different ones of said additional groups of digits respectively and the corresponding portion of said particular word on said element, a plurality of light responsive units for responding to passage of light through said different additional groups of digits respectively, circuitry responsive to said selection control data on said element for selecting which of said light responsive units is active at a particular time to thereby select a particular column of said additional groups for scanning, and an indicator actuable by said light-responsive units to indicate when no light passes through either said one group of digits of a family being examined or a selected additional group of digits of said family.

27. Data-processing apparatus as recited in claim 12, in which said comparing means are operable to compare said second mentioned portion of said particular word with a series of said additional groups of digits in said family.

28. Data-processing apparatus as recited in claim 12, in which said different families of words are written in sequence longitudinally of a record track, and the individual groups of digits in each family are written in sequence longitudinally of said track.

29. Data-processing apparatus as recited in claim 12, in which said different families of words are written in sequence longitudinally of a record track, and the individual groups of digits in each family are written in sequence longitudinally of said track, said comparing means being operable to compare said second mentioned portion of said particular word with a series of said additional groups of digits in a family separately and sequentially.

30. Data-processing apparatus comprising means for comparing a particular digital word with a number of digital words represented in a list in which families of words are written in compacted form as one group of digits which are identical in all words of a family and a plurality of additional groups of digits constituting dissimilar other portions of the words of said family, said comparing means including means for comparing one portion of said particular word with said one group of digits of a family in said list, and comparing another portion of said particular word with one of said additional groups of digits in the same family.